(12) United States Patent
Souche (10) Patent No.: US 10,732,310 B2
(45) Date of Patent: Aug. 4, 2020

(54) SEISMIC ATTRIBUTES DERIVED FROM THE RELATIVE GEOLOGICAL AGE PROPERTY OF A VOLUME-BASED MODEL

(71) Applicant: Schlumberger Technology Corporation, Sugar Land, TX (US)

(72) Inventor: Laurent Arnaud Souche, Kuala Lumpur (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 305 days.

(21) Appl. No.: 15/545,717

(22) PCT Filed: Jan. 26, 2016

(86) PCT No.: PCT/US2016/014808
§ 371 (c)(1),
(2) Date: Jul. 23, 2017

(87) PCT Pub. No.: WO2016/126453
PCT Pub. Date: Aug. 11, 2016

(65) Prior Publication Data
US 2018/0003841 A1 Jan. 4, 2018

(30) Foreign Application Priority Data
Feb. 5, 2015 (FR) .................. 15 50910

(51) Int. Cl.
*G01V 1/28* (2006.01)
*G01V 1/34* (2006.01)
*G01V 99/00* (2009.01)

(52) U.S. Cl.
CPC .......... *G01V 1/345* (2013.01); *G01V 1/282* (2013.01); *G01V 99/00* (2013.01)

(58) Field of Classification Search
CPC ........ G01V 1/345; G01V 1/282; G01V 99/00
See application file for complete search history.

(56) References Cited

U.S. PATENT DOCUMENTS 5,691,958 A * 11/1997 Calvert ................. G01V 1/28
   367/73
5,706,194 A   1/1998 Neff et al.
(Continued)

FOREIGN PATENT DOCUMENTS

EP   1045259 A1   10/2000
EP   1096270 A2   5/2001
(Continued)

OTHER PUBLICATIONS

Guillon, et al., "Geotime: A 3D automatic tool for chronostratigraphic seismic interpretation and filtering," The Leading Edge, Feb. 2013, vol. 32, No. 2, pp. 154-159.
(Continued)

*Primary Examiner* — Krystine E Breier (57) ABSTRACT

A method to model a subterranean formation of a field. The method includes obtaining a seismic volume comprising a plurality of seismic traces of the subterranean formation of the field, computing, based on the seismic volume, a seismically-derived value of a structural attribute representing a structural characteristic of the subterranean formation, computing, based on a structural model, a structurally-derived value of the structural attribute, the structural model comprising a plurality of structural layers of the of the subterranean formation, comparing the seismically-derived value and the structurally-derived value to generate a difference value representing a discrepancy of modeling the structural attribute at a corresponding location in the subterranean formation, and generating a seismic interpretation result based on the difference value and the corresponding location.

19 Claims, 6 Drawing Sheets

(56) References Cited

U.S. PATENT DOCUMENTS

| | | | |
|---|---|---|---|
| 5,798,982 A * | 8/1998 | He | G01V 1/306 367/28 |
| 6,302,221 B1 | 10/2001 | Hamman et al. | |
| 6,665,615 B2 * | 12/2003 | Van Riel | G01V 1/306 702/17 |
| 6,970,397 B2 * | 11/2005 | Castagna | G01V 1/30 367/38 |
| 7,373,251 B2 * | 5/2008 | Hamman | G01V 1/306 702/14 |
| 7,400,978 B2 * | 7/2008 | Langlais | G01V 1/306 702/14 |
| 7,974,824 B2 * | 7/2011 | Song | G01V 1/282 367/9 |
| 8,339,898 B2 | 12/2012 | Smith et al. | |
| 8,489,375 B2 * | 7/2013 | Omeragic | G01V 11/00 703/10 |
| 8,694,299 B2 * | 4/2014 | Krebs | G01V 11/00 703/10 |
| 9,075,159 B2 * | 7/2015 | Washbourne | G01V 1/30 |
| 10,197,703 B2 * | 2/2019 | Deschamps | G01V 8/02 |
| 2009/0043554 A1 | 2/2009 | Horne et al. | |
| 2013/0332125 A1 * | 12/2013 | Suter | G01V 99/00 703/6 |
| 2014/0083681 A1 * | 3/2014 | Taylor | E21B 43/26 166/250.1 |
| 2014/0377872 A1 * | 12/2014 | Brosse | G01V 11/00 436/29 |
| 2015/0301208 A1 * | 10/2015 | Lewis | G01V 1/282 702/14 |
| 2016/0124116 A1 | 5/2016 | Souche et al. | |

FOREIGN PATENT DOCUMENTS

| | | |
|---|---|---|
| WO | 9738330 A1 | 10/1997 |
| WO | 2012160331 A2 | 11/2012 |

OTHER PUBLICATIONS

Panhaleux, et al., "Enforcing Geological Consistency Through Interactive Seismic Flattening While Interpreting," EAGE Conference on Integrated Reservoir Modeling, Dubai, UAE Nov. 25-28, 2012.

Pedersen, "Automatic Fault Extraction Using Artificial Ants," Mathematical Methods and Modelling in Hydrocarbon Exploration and Production Mathematics in Industry vol. 7, 2005, pp. 107-116.

Qayyum, et al., "A modern approach to build 3D sequence stratigraphic framework," Oil and Gas Journal, Oct. 7, 2013, pp. 46-65.

Qayyum, et al., "A New Approach to Stratigraphic Interpretation," AAPG Search and Discovery Article #41195, Sep. 16, 2013.

Qayyum, et al., "Using 3D Wheeler diagrams in seismic interpretation—the HorizonCube method," First Break vol. 30, Mar. 26-27, 2012, Edinburgh, UK, pp. 103-109.

Saito, et al., "New algorithms for Euclidean Distance Transformation of an n-Dimensional Digitized Picture with Applications," Pattern Recognition, vol. 27, No. 11, pp. 1551-1565, 1994.

Wolak, et al., "Reconstruction of depocenter evolution through time using relative stratigraphic thickness", The Leading Edge, Feb. 2013, pp. 172-177.

International Search Report and Written Opinion for the equivalent International patent application PCT/US2016/014808 dated Apr. 26, 2016.

International Preliminary Report on Patentability for PCT/US2016/014808 dated Aug. 17, 2017.

An extended European search report issued by the European Patent Office dated Oct. 12, 2018 in connection with European patent Application No. 16746972.5.

Communication pursuant to Article 94(3) for the counterpart European patent application No. 167469725 dated Jun. 22, 2020.

* cited by examiner

SEISMIC ATTRIBUTES DERIVED FROM THE RELATIVE GEOLOGICAL AGE PROPERTY OF A VOLUME-BASED MODEL

CROSS-REFERENCE TO RELATED APPLICATIONS

This application claims priority to France Patent Application having serial no. 1550910, which was filed on Feb. 5, 2015 and is incorporated herein by reference in its entirety.

BACKGROUND

Operations, such as surveying, drilling, wireline testing, completions, production, planning and field analysis, may be performed to locate and gather valuable downhole fluids. Surveys are often performed using acquisition methodologies, such as seismic scanners or surveyors to generate maps of underground formations. These formations are often analyzed to determine the presence of subterranean assets, such as valuable fluids or minerals, or to determine if the formations have characteristics suitable for storing fluids. The subterranean assets are not limited to hydrocarbon such as oil, throughout this document, the terms "oilfield" and "oilfield operation" may be used interchangeably with the terms "field" and "field operation" to refer to a field having any types of valuable fluids or minerals and field operations relating to any of such subterranean assets.

SUMMARY

In general, in one aspect, the invention relates to a method to model a subterranean formation of a field. The method includes obtaining a seismic volume comprising a plurality of seismic traces of the subterranean formation of the field, computing, based on the seismic volume, a seismically-derived value of a structural attribute representing a structural characteristic of the subterranean formation, computing, based on a structural model, a structurally-derived value of the structural attribute, the structural model comprising a plurality of structural layers of the of the subterranean formation, comparing the seismically-derived value and the structurally-derived value to generate a difference value representing a discrepancy of modeling the structural attribute at a corresponding location in the subterranean formation, and generating a seismic interpretation result based on the difference value and the corresponding location.

BRIEF DESCRIPTION OF DRAWINGS

The appended drawings illustrate several embodiments of seismic attributes derived from the relative geological age property of a volume-based model and are not to be considered limiting of its scope, for seismic attributes derived from the relative geological age property of a volume-based model may admit to other equally effective embodiments.

DETAILED DESCRIPTION

Embodiments are shown in the above-identified drawings and described below. In describing the embodiments, like or identical reference numerals are used to identify common or similar elements. The drawings are not necessarily to scale and certain features and certain views of the drawings may be shown exaggerated in scale or in schematic in the interest of clarity and conciseness.

Embodiments described herein include a workflow for computing structural attributes of the subterranean formation. Seismically-derived values and structurally-derived values of the structural attributes are compared to generate comparison differences. In one or more embodiments, the structurally-derived values are derived from the relative geological age property of a structural model. The comparison differences correspond to the differences between the volume-based model and the seismic data from which the volume-based model has been derived. Accordingly, the seismic data analysis and/or the volume-based model are adjusted to minimize the differences and improve the accuracy of the computed seismic attributes and structural attributes.

Figure 1:
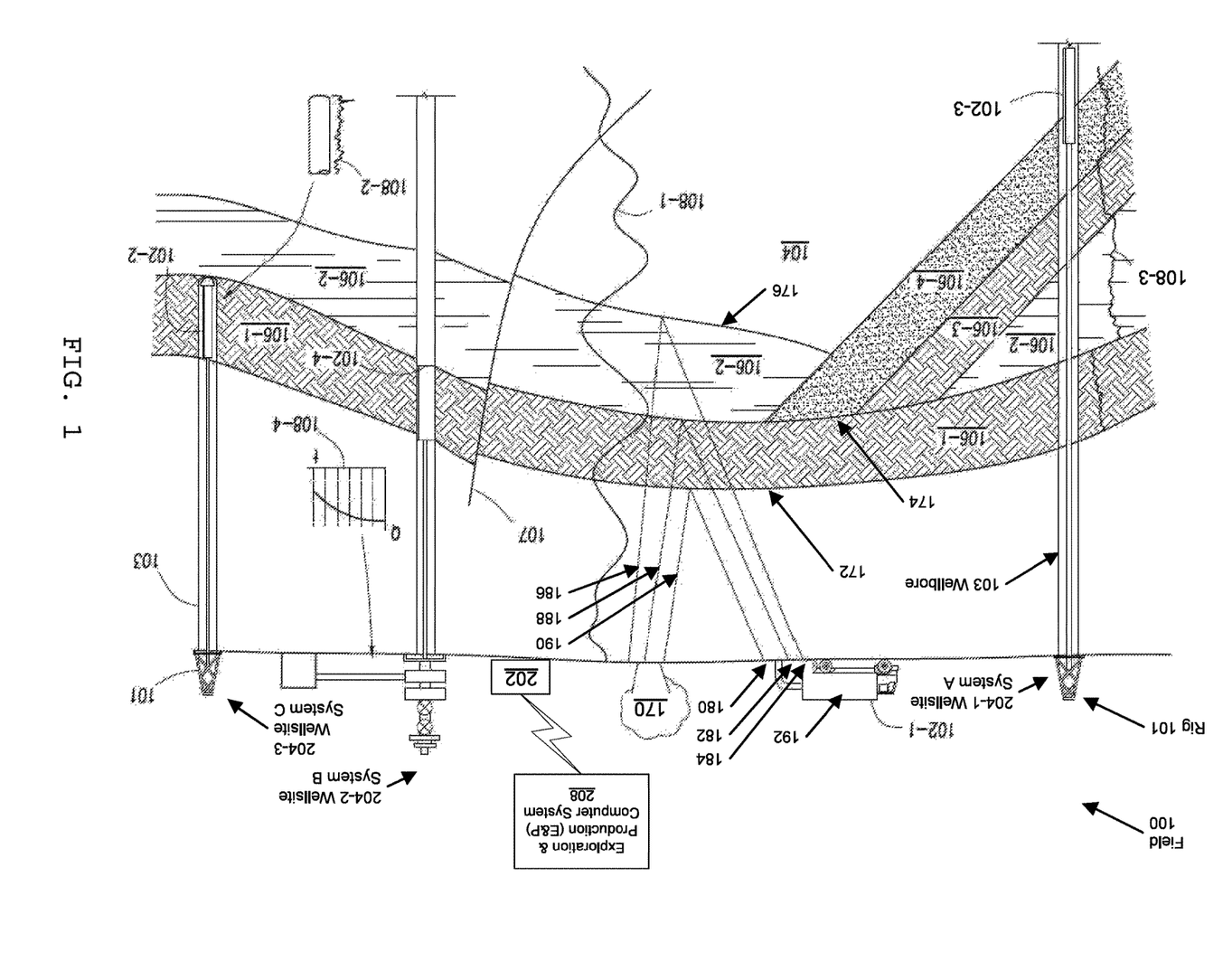
FIG. 1 is a schematic view, partially in cross-section, of a field having a plurality of data acquisition tools positioned at various locations along the field for collecting data from the subterranean formation, in which embodiments of seismic attributes derived from the relative geological age property of a volume-based model may be implemented.

FIG. 1 depicts a schematic view, partially in cross section, of a field (100) in which one or more embodiments of seismic attributes derived from the relative geological age property of a volume-based model may be implemented. In one or more embodiments, one or more of the modules and elements shown in FIG. 1 may be omitted, repeated, and/or substituted. Accordingly, embodiments of quality control of three dimensional (3D) horizon auto-tracking in seismic volume should not be considered limited to the specific arrangements of modules shown in FIG. 1.

As shown in FIG. 1, the field (100) includes the subterranean formation (104), data acquisition tools (102-1), (102-2), (102-3), and (102-4), wellsite system A (204-1), wellsite system B (204-2), wellsite system C (204-3), a surface unit (202), and an exploration and production (E&P) computer system (208). The subterranean formation (104) includes several geological structures, such as a sandstone layer (106-1), a limestone layer (106-2), a shale layer (106-3), a sand layer (106-4), and a fault line (107).

In one or more embodiments, data acquisition tools (102-1), (102-2), (102-3), and (102-4) are positioned at various locations along the field (100) for collecting data of the subterranean formation (104), referred to as survey operations. In particular, these data acquisition tools are adapted to measure the subterranean formation (104) and detect the characteristics of the geological structures of the subterranean formation (104). For example, data plots (108-1), (108-2), (108-3), and (108-4) are depicted along the field (100) to demonstrate the data generated by these data acquisition tools. Specifically, the static data plot (108-1) is a seismic two-way response time. Static plot (108-2) is core sample data (measured from a core sample of the formation (104)) or other petrophysical log data. Static data plot (108-3) is a logging trace, referred to as a well log. Production decline curve or graph (108-4) is a dynamic data plot of the fluid flow rate over time. Other data may also be collected, such as historical data, user inputs, economic information, and/or other measurement data and other parameters of interest.

To capture the seismic two-way response time in the static data plot (108-1), the data acquisition tools (102-1) may be a seismic truck that is adapted to measure properties of the subterranean formation based on sound vibrations. One such sound vibration (e.g., 186, 188, 190) generated by a source (170) reflects off a plurality of horizons (e.g., 172, 174, 176) in the subterranean formation (104). Each of the sound vibrations (e.g., 186, 188, 190) is received by one or more sensors (e.g., 180, 182, 184), such as geophone-receivers, situated on the Earth's surface. The geophones produce electrical output signals, which may be transmitted, for example, as input data to a computer (192) on the seismic truck (102-1). Responsive to the input data, the computer (192) may generate a seismic data output, such as the seismic two-way response time in the form of a seismic trace.

Further as shown in FIG. 1, each of the wellsite system A (204-1), wellsite system B (204-2), and wellsite system C (204-3) is associated with a rig, a wellbore, and other wellsite equipment configured to perform wellbore operations, such as logging, drilling, fracturing, production, or other applicable operations. For example, the wellsite systems (204-1), (204-2), (204-3) are associated with a rig (101), a wellbore (103), and drilling equipment to perform drilling operation. Similarly, the wellsite system B (204-2) and wellsite system C (204-3) are associated with respective rigs, wellbores, other wellsite equipment, such as production equipment and logging equipment to perform production operation and logging operation, respectively. Generally, survey operations and wellbore operations are referred to as field operations of the field (100). In addition, data acquisition tools and wellsite equipment are referred to as field operation equipment. These field operations may be performed as directed by a surface unit (202). For example, the field operation equipment may be controlled by a field operation control signal sent from the surface unit (202).

In one or more embodiments, the surface unit (202) is operatively coupled to the data acquisition tools (102-1), (102-2), (102-3), (102-4), and/or the wellsite systems (204-1), (204-2), (204-3). In particular, the surface unit (202) is configured to send commands to the data acquisition tools (102-1), (102-2), (102-3), (102-4), and/or the wellsite systems (204-1), (204-2), (204-3) and to receive data therefrom. In one or more embodiments, the surface unit (202) may be located at the wellsite systems (204-1), (204-2), (204-3) and/or remote locations. The surface unit (202) may be provided with computer facilities for receiving, storing, processing, and/or analyzing data from the data acquisition tools (102-1), (102-2), (102-3), (102-4), the wellsite systems (204-1), (204-2), (204-3), and/or other part of the field (100). The surface unit (202) may also be provided with or functionally for actuating mechanisms at the field (100). The surface unit (202) may then send command signals to the field (100) in response to data received, for example to control and/or optimize various field operations described above.

In one or more embodiments, the surface unit (202) is communicatively coupled to an E&P computer system (208). In one or more embodiments, the data received by the surface unit (202) may be sent to the E&P computer system (208) for further analysis. Generally, the E&P computer system (208) is configured to analyze, model, control, optimize, or perform management tasks of the aforementioned field operations based on the data provided from the surface unit (202). In one or more embodiments, the E&P computer system (208) is provided with functionality for manipulating and analyzing the data, such as performing seismic interpretation or borehole resistivity image log interpretation to identify geological surfaces in the subterranean formation (104) or performing simulation, planning, and optimization of production operations of the wellsite systems (204-1), (204-2), (204-3). In one or more embodiments, the result generated by the E&P computer system (208) may be displayed for user viewing using a two dimensional (2D) display, three dimensional (3D) display, or other suitable displays. Although the surface unit (202) is shown as separate from the E&P computer system (208) in FIG. 1, in other examples, the surface unit (202) and the E&P computer system (208) may also be combined.

Figure 2:
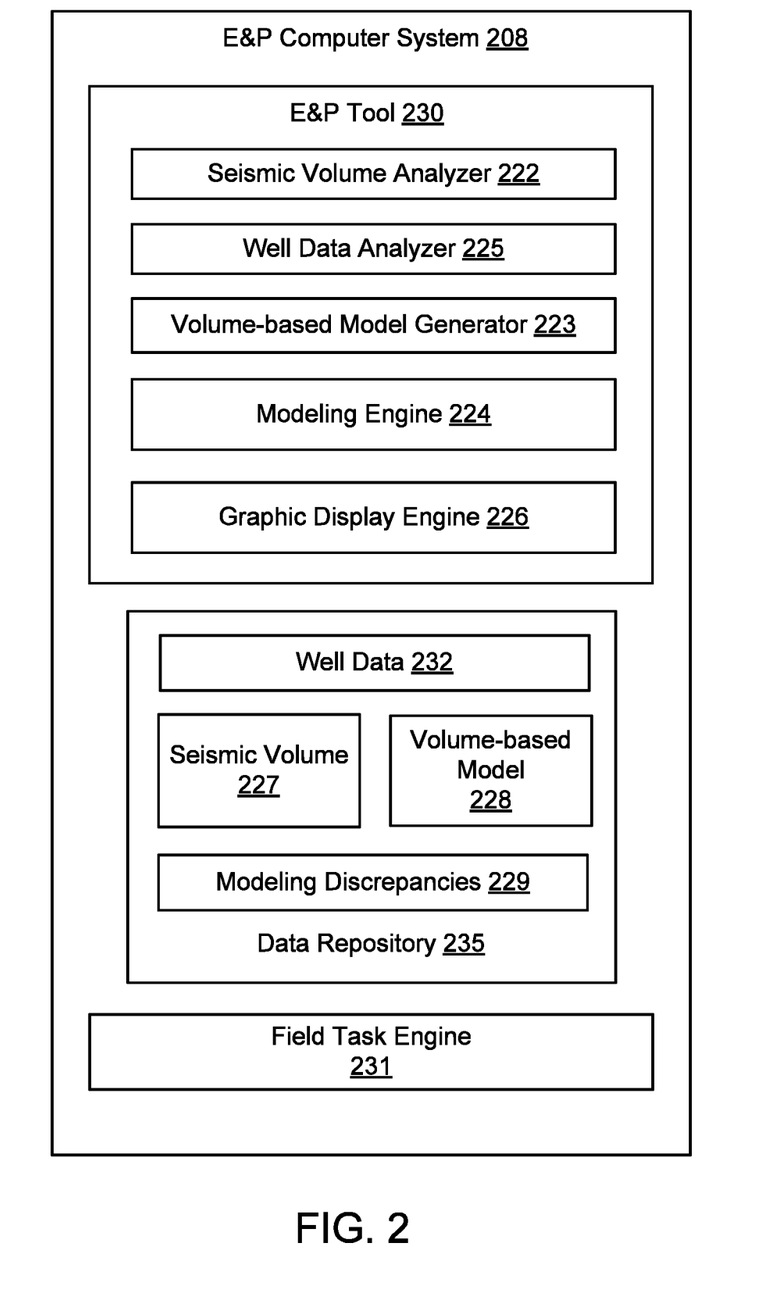
FIG. 2 shows an example system in which one or more embodiments of seismic attributes derived from the relative geological age property of a volume-based model may be implemented.

FIG. 2 shows more details of the E&P computer system (208) in which one or more embodiments of seismic attributes derived from the relative geological age property of a volume-based model may be implemented. In one or more embodiments, one or more of the modules and elements shown in FIG. 2 may be omitted, repeated, and/or substituted. Accordingly, embodiments of seismic attributes derived from the relative geological age property of a volume-based model should not be considered limited to the specific arrangements of modules shown in FIG. 2.

As shown in FIG. 2, the E&P computer system (208) includes a E&P Tool (230), a data repository (235) for storing intermediate data and resultant outputs of the E&P Tool (230), and a field task engine (231) for performing various tasks of the field operation. In one or more embodiments, the data repository (235) may include a disk drive storage device, a semiconductor storage device, other suitable computer data storage device, or combinations thereof. In one or more embodiments, content stored in the data repository (235) may be a data file, a linked list, a data sequence, a database, a graphical representation, or any other suitable data structure. The data repository (235) includes functionality to store data, such as a seismic volume (227), well data (232), a volume-based model (228), and modeling discrepancies (229). The data repository (235) may include functionality to store additional data not shown in FIG. 2. Various types of data stored in the data repository are discussed below.

During the field operations depicted in FIG. 1 above, data may be collected for analysis and/or monitoring of the operations. Such data may include, for instance, information regarding subterranean formations, equipment, and historical and/or other data. Data concerning the subterranean formation may be collected using a variety of sources. Such formation data may be static or dynamic. Static data is data that generally does not change except through major geological events and extended geological timeframes. Static data relates to, for instance, formation structure and geological stratigraphy that define geological structures of the subterranean formation. Dynamic data is data that may change over time. Dynamic data relates to, for instance, fluids flowing through the geologic structures of the subterranean formation over time. Such static and/or dynamic data may be collected to learn more about the formations and the valuable assets contained therein.

The data may be used to predict downhole conditions and make decisions concerning field operations. Such decisions may involve well planning, well targeting, well completions, operating levels, production rates, and other operations and/or operating parameters. A large number of variables and large quantities of data to consider may exist in analyzing field operations. Because of the large number of variables and large quantities of data, modeling the behavior of the field operation to determine the desired course of action may be useful. During the ongoing operations, the operating parameters may be adjusted as field conditions change and new information is received. Various aspects of field operations, such as geological structures, downhole reservoirs, wellbores, surface facilities, as well as other portions of the field operation, may be modeled.

Seismic surveying may be performed by imparting energy to the earth at one or more source locations, for example, by way of controlled explosion, mechanical input, or other technique. Return energy is then measured as seismic signals at surface receiver locations at varying distances and azimuths from the source location. The travel time of energy from source to receiver, measured via reflections and refractions from interfaces of subsurface strata, indicates the depth and orientation of such strata. The seismic signals may be measured in the form of seismic traces, which are mathematical curves representing the measured signal amplitudes (i.e., seismic amplitudes) as a function of depth or as a function of seismic travel time.

A collection of seismic traces within a volume of interest may be referred to as a seismic volume (227). In other words, a seismic volume (227) is the collection of seismic data (i.e., seismic traces) for a particular subterranean region of the Earth, which is referred to as a volume of interest. A seismic volume (227) may be displayed as seismic images based on different sampling resolutions and viewing orientations, as well as subject to various different seismic amplitude-processing techniques to enhance or highlight seismic reflection patterns.

In one or more embodiments, the seismic volume (227) may be partitioned into cells. In other words, each cell represents a particular sub-region of the seismic volume (227). Sub-regions of the seismic volume (227) may be homogeneous or heterogeneous in size and/or shape. For example, the cells may be defined by a gridding of the seismic volume (227), whereby each intersecting point of grid lines in the grid defines a vetex of a cell, and whereby a regular grid or an adaptive grid may be used.

In one or more embodiments, the seismic traces depicted in FIG. 1 above are provided to the E&P computer system (208) and stored in the data repository (235) as the seismic volume (227). In one or more embodiments, the seismic volume (227) may be displayed as a three dimensional (3D) volume to a user performing seismic interpretation, who is referred to as a seismic interpretation user. The top of the displayed 3D seismic volume represents the surface location of individual seismic traces. Within the 3D seismic volume, the seismic traces may be represented as vertical lines of seismic amplitude versus time or distance along the z-axis of the 3D volume. Specifically, each individual trace is amplitude versus time representation of an acoustic reflection from geological structures in the subterranean formation. Other representations of seismic traces may be used without departing from the scope of one or more embodiments. A sequence of x versus time traces is referred to as a "line" or "in-line" in seismic interpretation. A sequence of y versus time traces is referred to as a "cross-line." A "horizon slice" is a slice in the 3D volume that is identified by the seismic interpretation user as corresponding to a horizon (e.g., one of the horizons (172, 174, 176)) in the subterranean formation (104) depicted in FIG. 1 above.

Throughout this disclosure, the term "structural attributes" refers to structural characteristics of the subterranean formation. In one or more embodiments, the structural attributes may be estimated by applying a combination of signal processing and differential geometry techniques to the seismic volume. The values of the structural attributes directly computed from the seismic volume (227) are referred to as seismically-derived values or seismic attributes. Specifically, seismically-derived values or seismic attributes are values of the structural attributes that are directly computed from the seismic volume (227) without any other intermediate volume-based modeling process. In other words, the seismic volume (227) is the only volume-based data structure used in computing seismically-derived values or seismic attributes. Certain seismic attributes are single trace attributes computed based on a single seismic trace independently from each other, while multi-trace attributes are computed based on the relationship between neighboring seismic traces. Many structural attributes are multi-trace attributes. For example, estimated dip of the geological layers is a multi-trace attribute determined from the anisotropy of the seismic traces or from the correlation between neighboring seismic traces. In another example, estimated curvature of geological layers is another multi-trace attribute that highlights the localization of fault surfaces.

A particular type of structural attributes relates to depositional (i.e., stratigraphic) characteristics of the subterranean formation. Structural attributes of such type are particularly referred to as stratigraphic attributes. For example, stratigraphic attributes include information about the sedimentary patterns, stratigraphic layering, or depositional environment associated with the subsurface deposit. Convergence density is an example of computing seismically-derived values of a stratigraphic attribute.

Seismic images may also be used to indirectly estimate the structural attributes of the subterranean formation through a modeling process in order to create a volume-based model (228). The spatial and/or temporal variability of stacking patterns, or sequences, observed in seismic images relates to depositional environments and post-depositional processes, such as erosion and tectonic activity. In other words, reflection patterns in the seismic images relate depositional environments and vertical stacking order to sequence of deposition in the subterranean formation. During seismic interpretation, relative timing of the seismic image reflection patterns enables the geological history of the subsurface to be deciphered and leads to the estimation of probable sedimentary characteristics. The seismic interpretation and analysis results may be organized as a volume-based model (228). Generally, a volume-based model is a three-dimensional (3D) data volume that models geological characteristics within a volume of interest. In one or more embodiments, the volume of interest may be partitioned into multiple units such as geological layers, fault blocks, sedimentary bodies, etc. The creation of a volume-based model may involve the interpolation or extrapolation of interpreted seismic data or the interpolation or extrapolation of interpreted well data. Information from well data (i.e., from core or petrophysical logs) and information from seismic data may be combined into a single volume-based model. For example, the volume-based model (228) may include information that describes stratigraphic layers and fault blocks in the subterranean formation, and may also be referred to as a structural model. In other words, the term "structural model" refers to a volume-based model that describes structures (e.g., stratigraphic layers and fault blocks) of the subterranean formation. In one or more embodiments, the volume-based model (228) is a structural model and further includes information describing relative geological age of the subterranean formations at each point of the volume of interest. Examples of the volume-based model (228) are described in reference to FIGS. 4 and 5 below.

In one or more embodiments, similar to the seismic volume (227), the volume-based model (228) may be partitioned into cells. In other words, each cell represents a particular sub-region of the volume-based model (228). Sub-region of the volume-based model (228) may be homogeneous or heterogeneous in size and/or shape. For example, the cells may be defined by a gridding of the volume-based model (228), whereby each intersecting points of grid lines in the grid defines a vertex of a cell, and whereby a regular grid or an adaptive grid may be used. The seismic volume (227) and the volume-based model (228) are specific types of volume-based data structure containing measured seismic data and modeled structural description data, respectively. Further, in some embodiments, a one-to-one mapping may exist between cells of the volume-based model (228) and cells in the seismic volume (227). In other embodiments, the cells in the volume-based model (228) do not match cells in the seismic volume (227).

The structural model is used in a modeling process to estimate the structural attributes of the subterranean formation. The values of the structural attributes estimated using the structural model are referred to as structurally-derived values. As noted above, the structural model (being a type of volume-based model) may be based on well data, seismic data, or a combination of well data and seismic data. Accordingly, the structurally-derived values are values of the structural attributes that are computed using the structural model, either without being based on any seismic data at all, or indirectly based on the seismic volume (227). Generally, the seismic volume (227) is the only volume-based data structure used in computing seismically-derived values or seismic attributes. In comparison, the structurally-derived values or structural attributes are computed using at least one volume-based data structure (e.g., the volume-based model (228)) separate from or in addition to the seismic volume (227).

In one or more embodiments, in addition to the seismic volume (227), the core sample data or other petrophysical log data (e.g., static plot (108-2)) depicted in FIG. 1 above are also provided to the E&P computer system (208) and stored in the data repository (235) as the well data (232). In one or more embodiments, formation tops in the subterranean formation may be estimated based on the changes of lithology analyzed from the core or petrophysical log data.

In one or more embodiments, the E&P Tool (230) is configured to facilitate seismic interpretation and formation modeling. As shown in FIG. 2, the E&P Tool (230) includes the seismic volume analyzer (222), the well data analyzer (225), the volume-based model generator (223), the modeling engine (224), and the graphic display engine (226). Each of these components is described below.

In one or more embodiments, the seismic volume analyzer (222) is configured to analyze the seismic volume (227) to generate a seismically-derived value of a structural attribute at one or more locations in the subterranean formation. For example, the seismic volume analyzer (222) may generate the seismically-derived value based on the examples described in various references listed above. Examples of the seismically-derived value of a structural attribute are described in reference to FIG. 5 below.

In one or more embodiments, the volume-based model generator (223) is configured to analyze the seismic volume (227) to generate the volume-based model (228) (e.g., a structural model) of the subterranean formation. In one or more embodiments, the well data analyzer (225) is configured to estimate formation tops in the subterranean formation based on the changes of lithology analyzed from the core or petrophysical log data contained in the well data (232). In one or more embodiments, the volume-based model generator (223) is configured to generate the volume-based model (228) (e.g., a structural model) of the subterranean formation based on the results of the well data analyzer (225) without replying on any seismic data. In one or more embodiments, the volume-based model generator (223) is configured to generate the volume-based model (228) (e.g., a structural model) of the subterranean formation based on a combination of the seismic volume (227) and the results of the well data analyzer (225).

In one or more embodiments, the modeling engine (224) is configured to compute, based on the volume-based model (228), a structurally-derived value of the structural attribute at one or more locations in the subterranean formation. In addition, the modeling engine (224) is further configured to compare the seismically-derived value and the structurally-derived value to generate a difference value representing a discrepancy (i.e., among the modeling discrepancies (229)) of modeling the structural attribute at a corresponding location in the subterranean formation. In one or more embodiments, the modeling discrepancies (229) are minimized or otherwise reduced by the seismic volume analyzer (222) adjusting the seismic data analysis and/or the modeling engine (224) adjusting the volume-based model (228). In one or more embodiments, the modeling discrepancies (229) are displayed to a seismic interpreter user or a structural modeler user through the graphical display engine (226). Accordingly, the seismic interpreter user or the structural modeler user may manually adjust the seismic data analysis and/or the volume-based model (228). In one or more embodiments, the E&P Tool (230) minimizes or otherwise reduces the modeling discrepancies (229) using the method described in reference to FIG. 3 below. An example of minimizing or otherwise reducing the modeling discrepancies (229) based on the comparison differences are described in reference to FIGS. 4 and 5 below. In one or more embodiments, the graphic display engine (226) is configured to generate a graphic display representing the results of the E&P tool (230). For example, the graphic display may be presented to a user on a 2D or 3D physical display device and correspond to various screenshots depicted in FIGS. 4 and 5 below.

In one or more embodiments, the field task engine (231) is configured to generate a field operation control signal based at least on the interpreted horizon (229). As noted above, the field operation equipment depicted in FIG. 1 above may be controlled by the field operation control signal. For example, the field operation control signal may be used to control drilling equipment, an actuator, a fluid valve, or other electrical and/or mechanical devices disposed about the field (100) depicted in FIG. 1 above.

The E&P computer system (208) may include one or more system computers, which may be implemented as a server or any conventional computing system. However, those skilled in the art, having benefit of this disclosure, will appreciate that implementations of various technologies described herein may be practiced in other computer system configurations, including hypertext transfer protocol (HTTP) servers, hand-held devices, multiprocessor systems, microprocessor-based or programmable consumer electronics, network personal computers, minicomputers, mainframe computers, and the like.

While specific components are depicted and/or described for use in the units and/or modules of the E&P computer system (208) and the E&P Tool (230), a variety of components with various functions may be used to provide the formatting, processing, utility and coordination functions for the E&P computer system (208) and the E&P Tool (230). The components may have combined functionalities and may be implemented as software, hardware, firmware, or combinations thereof.

Figure 3:
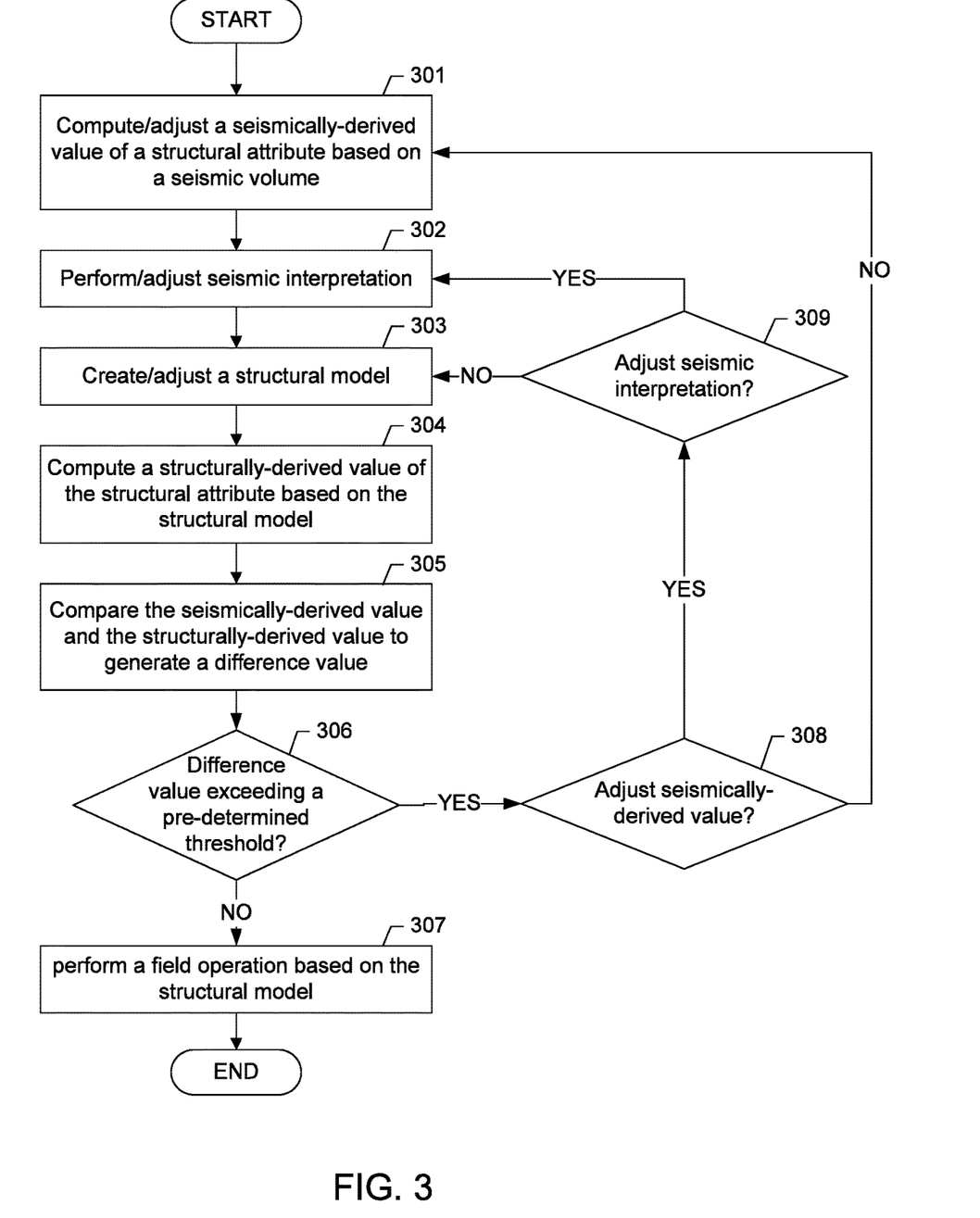
FIG. 3 shows an example method for seismic attributes derived from the relative geological age property of a volume-based model in accordance with one or more embodiments.

FIG. 3 shows an example method for seismic attributes derived from the relative geological age property of a volume-based model in accordance with one or more embodiments. For example, the method shown in FIG. 3 may be practiced using the E&P computer system (208) and the E&P Tool (230) described in reference to FIG. 2 above for the field (100) described in reference to FIG. 1 above. In one or more embodiments, one or more of the elements shown in FIG. 3 may be omitted, repeated, and/or performed in a different order. Accordingly, embodiments of seismic attributes derived from the relative geological age property of a volume-based model should not be considered limited to the specific arrangements of elements shown in FIG. 3.

Initially in Element 301, a seismically-derived value of a structural attribute is computed based on a seismic volume. In one or more embodiments, each cell of the seismic volume is associated with a seismically-derived value of one or more structural attributes. For example, dip and dip azimuth, minimum, maximum and Gaussian curvature, or the lateral variation of thickness along a layer are examples of structural attributes where seismically-derived values may be deduced directly from the analysis of neighboring seismic traces in the seismic volume.

In Element 302, a seismic interpretation based on the seismic volume is initially performed or iteratively adjusted. In other words, pre-known information about the velocity of signals through various types of rocks may be used to ascertain from the seismic traces in the seismic volume, to information about estimated underground formations, such as rock type, porosity, permeability, etc. Additional information gathered from the field, such as core samples, may be used to perform the seismic interpretation. In Element 303, a structural model of the subterranean formation is generated or iteratively adjusted from results of the seismic interpretation. In particular, from the seismic interpretation for each of the seismic traces, a structural volume is generated.

In Element 304, a structurally-derived value of the structural attribute is computed based on the structural model. In one or more embodiments, based on a sequence of structural layers described in the structural model, relative geologic ages of the structural layers are determined. The relative geologic ages of the structural layers are in turn used to determine the structurally-derived value of the structural attribute. For example, a layer dip attribute, a convergence density attribute, a layer curvature attribute, and/or a layer thickness attribute may be determined based on the relative geologic ages of the structural layers.

In Element 305, the seismically-derived value and the structurally-derived value are compared to generate a difference value for each cell of the seismic volume and/or the structural model. In particular, each difference value represents a discrepancy of modeling the structural attribute at a corresponding location in the subterranean formation. In one or more embodiments, seismic cells (i.e., cells in the seismic volume) and the structural cells (i.e., cells in the structural model) are compared to generate re-sampled cells. Specifically, the re-sampled cells are defined by a re-sampled grid of the volume of interest associated with the seismic volume and the structural model. Accordingly, the difference values are generated for each of the re-sampled cells by intrapolation and extrapolation from initial grids associated with the seismic volume and the structural model to the re-sampled grid.

In one or more embodiments, various cells may be discarded from further analysis. By way of an example, fault neighborhood zones are identified within a pre-determined distance from the faults described in the structural model. Accordingly, the difference values of the cells that are located within a predefined fault neighborhood zones are discarded for further analysis. In other words, such cells are not used for determining whether updates should be performed and performing any updates. As another example, the difference values of other cells may also be discarded based on the value of a seismic attribute relating to the degree of quality of the seismic image (e.g., signal to noise ratio, coefficient of correlation between neighboring seismic traces, etc.) or to the degree of certainty of the considered seismic attribute. The degree of quality of the seismic image or the degree of certainty of the considered seismic attribute is referred to as the seismic quality measure. In one or more embodiments, subsequent to discarding the aforementioned difference values, the remaining qualified difference values are displayed within a graphic window on a physical display.

In one or more embodiments, the structural attribute includes a layer dip attribute. In such embodiments, the difference values may be displayed during the seismic interpretation, allowing a seismic interpreter user to identify an additional fault from the seismic volume that was not included in the structural model. Accordingly, a revised structural model may be generated by adding the additional fault to those faults already existing in the structural model.

In Element 306, a determination is made as to whether the difference value exceeds a pre-determined threshold. In one or more embodiments, a statistical parameter (e.g., the maximum, median, average, etc.) of the difference values for the cells of the seismic volume and/or the structural model is used for this comparison. If the determination is positive, i.e., the difference value (e.g., the maximum, median, average, etc. of the difference values) exceeds the pre-determined threshold, the method proceeds to Element 308. If the determination is negative, i.e., the difference value (e.g., the maximum, median, average, etc. of the difference values) does not exceed the pre-determined threshold, the method proceeds to Element 307, where a field operation is performed based on the structural model.

In Element 308, a determination is made as to whether the seismically-derived values are to be adjusted to reduce the difference values. If the determination is positive, i.e., the seismically-derived values are to be adjusted, the method returns to Element 301, where the seismically-derived values are iteratively adjusted. For example, parameters used to generate the seismically-derived values may be adjusted automatically or based on user input.

If the determination in Element 308 is negative, i.e., the seismically-derived values are not to be adjusted, the method proceeds to Element 309, where another determination is made as to whether the seismic interpretation is to be adjusted to reduce the difference values. If the determination is positive, i.e., the seismic interpretation is to be adjusted, the method returns to Element 302, where the seismic interpretation is iteratively adjusted. For example, the difference values may be displayed to a seismic interpretation user as reference, such that the seismic interpretation may be adjusted based on input of the seismic interpretation user. If the determination is negative, i.e., the seismic interpretation is not to be adjusted, the method returns to Element 303, where the structural model is iteratively adjusted. For example, an additional fault identified based on the difference values may be automatically added to the structural model to generate a revised structural model.

Figure 4:
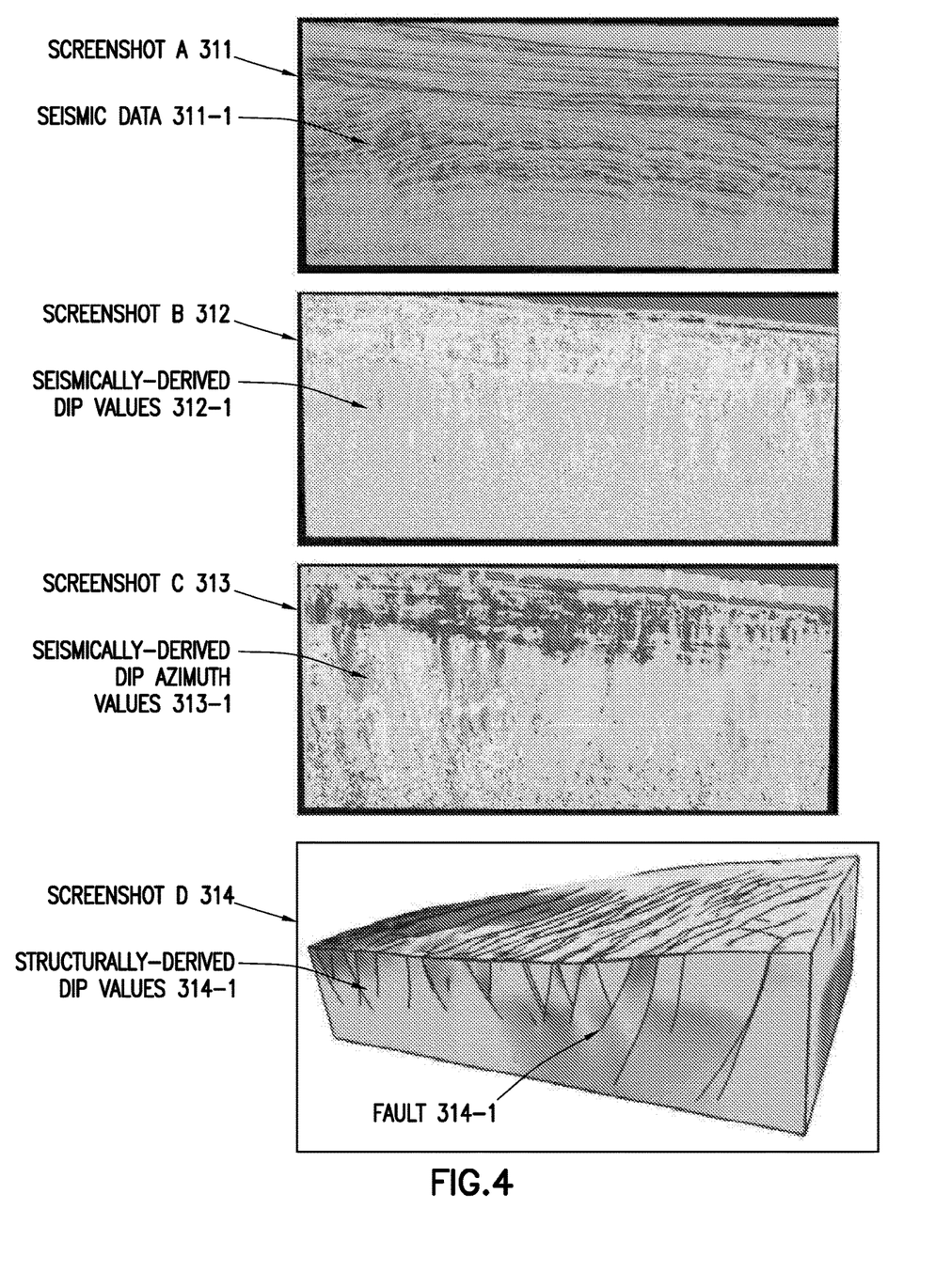
FIGS. 4 and 5 show example screenshots showing attributes derived from the seismic signal and attributes derived from the relative geological age property of a volume-based model in accordance with one or more embodiments.
Figure 5:
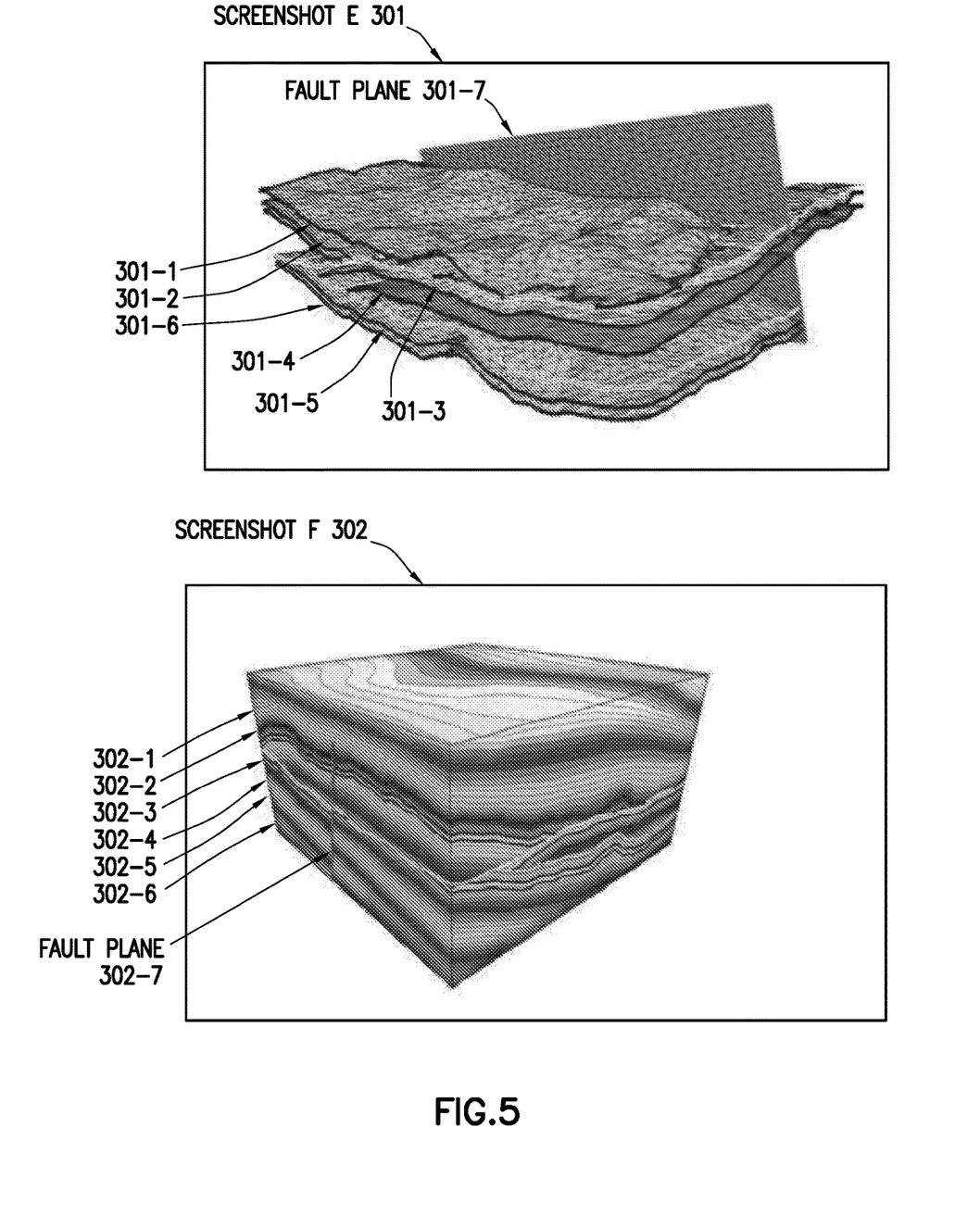

FIGS. 4 and 5 show example screenshots for seismic attributes derived from the relative geological age property of a volume-based model in accordance with one or more embodiments. Specifically, the screenshot A (311), screenshot B (312), screenshot C (313), screenshot D (314), screenshot E (301), and screenshot F (302) are generated using the WORKFLOW 1 presented below to identify subtle faults based on the structural attribute "dip". In particular, the workflow procedure listed in WORKFLOW 1 may be based on the E&P tool described in reference to FIG. 2 and the method described in reference to FIG. 3 above.

Workflow 1

(A) Compute the same structural attribute based on (1) the seismic traces in a seismic volume and (2) a relative geological age attribute in a 3D structural model derived from this seismic volume. In particular, a seismically-derived value of the structural attribute is computed for each cell in the seismic volume, and a structurally-derived value of the structural attribute is computed for each cell the 3D structural model. Specifically, the seismically-derived values are computed without using any volume-based model, such as the 3D structural model and associated relative geological age attribute.

(B) Resample the structurally-derived values computed using the relative geological age attribute into the cells of the seismic volume OR upscale the seismically-derived values into the cells of the 3D structural model.

(C) Optionally, normalize or rescale the seismically-derived values and the structurally-derived values to be in the same range, or having similar distributions.

(D) Compute either difference (or the ratio) between the seismically-derived values and the structurally-derived values at each cell of the model.

(E) Optionally, post-process the difference by applying a threshold or an edge-enhancement algorithm.

(F) Optionally, attach to the computed attribute a "reliability" attribute qualifying the degree of robustness of attribute computed in (A), (G) The difference is expected to highlight some discrepancies between the seismic data and the 3D structural model extracted from the seismic data. In one or more embodiments, Iso-contouring or volume rendering techniques may be used to visualize the results and relate the zones of high discrepancy to particular seismic interpretation or volume-based model features.

In addition to identifying subtle faults based on the "dip" attribute, the workflow procedure listed in WORKFLOW 1 may be applied to other scenarios, such as using the curvature attributes to highlight subtle folds or geo-bodies in the structural model, using the structural layer thickness changes (i.e., divergence of the dip vector) to identify sedimentary patterns, etc.

As shown in FIG. 4, the screenshot A (311) depicts a cross section of a seismic volume containing seismic data (311-1). The seismic signals are typically very noisy in the vicinity of fault surfaces, which correspond to a steeply dipping discontinuity in the subterranean formation. Such steeply dipping discontinuity creates high contrasts in the screenshot A (311). As a result, the "dip" and "dip azimuth" attributes computed from these areas in the seismic volume may be noisy and/or unreliable. The screenshot B (312) and screenshot C (313) show seismically-derived values of the "dip" attribute (i.e., seismically-derived dip values (312-1)) and "dip azimuth" attribute (i.e., seismically-derived dip azimuth values (313-1)), respectively based on the seismic volume depicted in the screenshot A (311).

The screenshot D (314) shows structurally-derived dip values (314-1) that are generated based on a structural model derived from the seismic volume depicted in the screenshot A (311). In particular, the screenshot D (314) shows faults (e.g., fault (314-1)) overlaying the structurally-derived dip values (314-1). In contrast to the seismically-derived values shown in the screenshot B (312) and screenshot C (313), the structurally-derived dip values (314-1) are discontinuous across faults (e.g., fault (314-1)), but smooth everywhere away from faults. Accordingly, the larger comparison differences between the seismically-derived dip values (312-1) and structurally-derived dip values (314-1) correspond to faults and neighborhood of faults with poor seismic quality. For example, the comparison may be performed using the workflow procedure listed in WORKFLOW 2 below.

Workflow 2

(A) Compute the normal vector to the structural layer based on the seismically-derived dip values (312-1) and seismically-derived dip azimuth values (313-1).

(B) Compute the gradient of the relative geological age in the structural model.

(C) Re-sample this gradient into the seismic volume.

(D) Compute the angle between the normal vector and the re-sample gradient. The computed angle is the "raw" dip discrepancy attribute.

As shown in FIG. 5, the screenshot E (301) and screenshot F (302) depict various aspects of the structural model derived from the seismic volume depicted in the screenshot A (311). Specifically, the screenshot E (301) shows a fault plane (301-7) intersecting structural layers (301-1) through (301-6). The screenshot F (302) shows values of an implicit function representing the relative geological ages of structural layers (302-1) through (302-6), corresponding to the structural layers (301-1) through (301-6) depicted in the screenshot E (301). Further, the fault plane (302-7) depicted in the screenshot F (302) corresponds to the fault plane (301-7) depicted in the screenshot E (301). For example, the implicit function shown in the screenshot F (302) may be derived from the seismic data (311-1). Accordingly, the implicit function may be used to compute the gradient of the relative geological age.

This "raw" discrepancy attribute can be post-processed using the workflow procedure listed in WORKFLOW 3 below to identify those faults that are present in the seismic data but have been taken into account in the structural model.

Workflow 3

(A) Apply a threshold to the "raw" dip discrepancy attribute to retain only high discrepancy values (e.g., discard all angles below 5 degrees).

(B) Filter-out zones located in the immediate neighborhood of faults identified in the structural model:

(B.1) Compute a "fault neighborhood" attribute based on the distance to the closest fault, e.g., as an Euclidean Distance Map computed using the Saito-Toriwaki algorithm, in the vicinity of faults of the structural framework.

(B.2) Define a region in the structural model that groups the points closest to the fault surfaces than a predetermined threshold distance.

(B.3) Use this "fault neighborhood" region to blank selected portions of the discrepancy attribute.

(C) Apply noise filtering and edge enhancement technique:

(C.1) Optionally remove isolated "high discrepancy" voxels using mathematical morphology operators.

(C.2) Apply edge-enhancement techniques such as "ant-tracking" to identify lineaments linking the zones of high-discrepancy attributes The output of the workflow listed in WORKFLOW 3 is a seismic attribute highlighting the subtle faults that are identified in the seismic volume but have been missed in the structural model. Specifically, the subtle faults have been missed in the structural model when the structural model was derived from the seismic volume.

Figure 6:
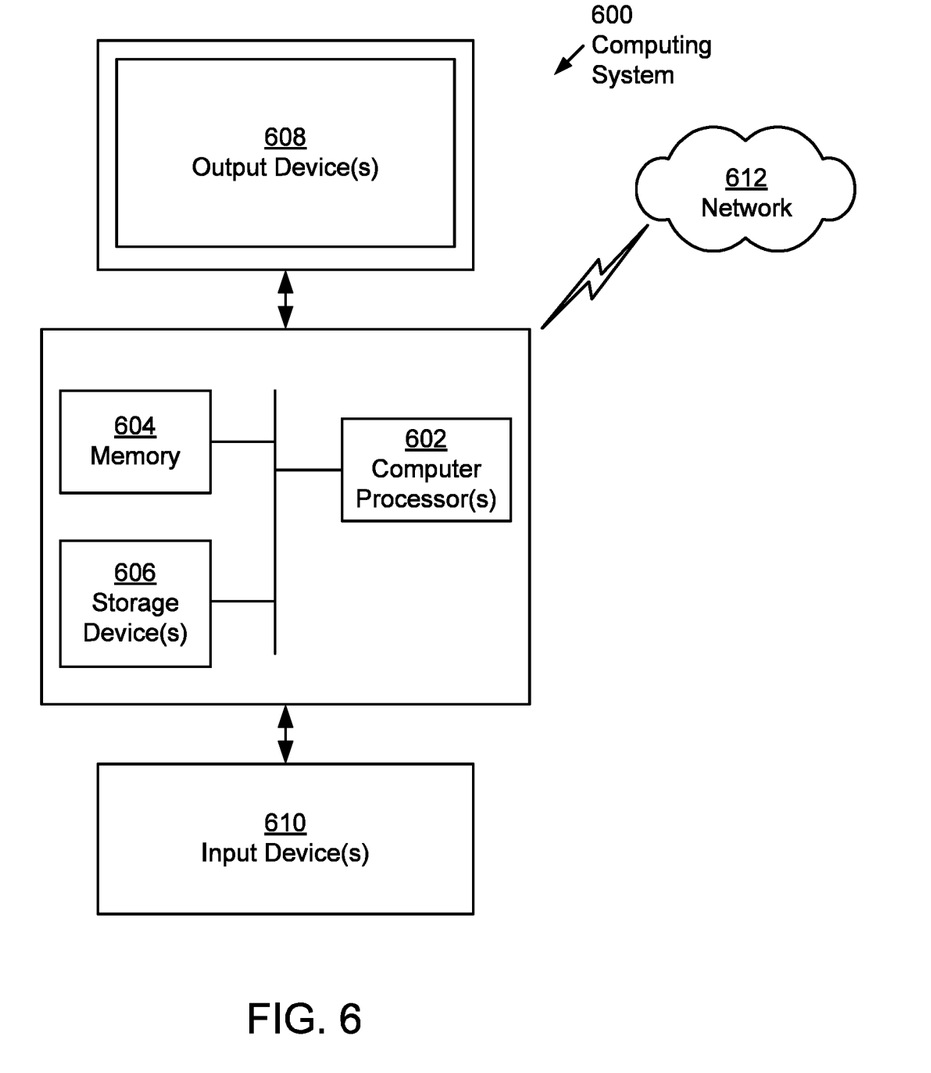
FIG. 6 shows a computer system in which one or more embodiments of seismic attributes derived from the relative geological age property of a volume-based model may be implemented.

Embodiments of seismic attributes derived from the relative geological age property of a volume-based model may be implemented on a computing system. Any combination of mobile, desktop, server, embedded, or other types of hardware may be used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor.

The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of seismic attributes derived from the relative geological age property of a volume-based model.

Further, one or more elements of the aforementioned computing system (600) may be located at a remote location and connected to the other elements over a network (612). Further, embodiments may be implemented on a distributed system having a plurality of nodes, where each portion of seismic attributes derived from the relative geological age property of a volume-based model may be located on a different node within the distributed system. In one embodiment of seismic attributes derived from the relative geological age property of a volume-based model, the node corresponds to a distinct computing device. The node may correspond to a computer processor with associated physical memory. The node may correspond to a computer processor or micro-core of a computer processor with shared memory and/or resources.

The systems and methods provided relate to the acquisition of hydrocarbons from an oilfield. It will be appreciated that the same systems and methods may be used for performing subsurface operations, such as mining, water retrieval, and acquisition of other underground fluids or other geomaterials from other fields. Further, portions of the systems and methods may be implemented as software, hardware, firmware, or combinations thereof.

While the subject matter of seismic attributes derived from the relative geological age property of a volume-based model has been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A method to model a subterranean formation of a field, comprising:

obtaining a seismic volume comprising a plurality of seismic traces of the subterranean formation of the field;

computing, based on the seismic volume, a plurality of seismically-derived values of a structural attribute representing a structural characteristic of the subterranean formation;

performing a seismic interpretation of the seismic volume;

computing, based on a structural model, a plurality of structurally-derived values of the structural attribute, the structural model comprising a plurality of structural layers of the of the subterranean formation;

comparing the seismically-derived values and the structurally-derived values to generate a plurality of difference values representing a discrepancy of modeling the structural attribute at a corresponding location in the subterranean formation;

determining a statistical representation of the difference values:

in response to the statistical representation of the difference values not exceeding a threshold, determining that a field operation is to be performed based on the structural model;

when the statistical representation of the difference values exceeds the threshold, determining if the seismic interpretation needs to be adjusted;

when the statistical representation of the difference values exceeds the threshold, determining if the structural model needs to be adjusted; and when it is determined the seismic interpretation or structural model needs to adjusted, adjusting the seismic interpretation or structural model until the statistical representation of the difference values does not exceed the threshold, and thereafter determining that a field operation is to be performed based on the structural model.

2. The method of claim 1, further comprising:

displaying, within a graphic window on a physical display, the difference value and the corresponding location; and performing, in response to the displaying, the seismic interpretation of the seismic volume to generate the seismic interpretation result, wherein the seismic interpretation is adjusted based at least on the difference values and the corresponding location.

3. The method of claim 2, further comprising:

receiving, in response to generating the seismic interpretation result, an adjustment of the structural model to generate the revised structural model, wherein the adjustment is based on the difference values and the corresponding location; and performing a field operation based on the revised structural model.

4. The method of claim 3, further comprising:

computing, based on the revised structural model, an adjusted structurally-derived value of the structural attribute;

comparing the seismically-derived values and the adjusted structurally-derived values to generate a plurality of adjusted difference values representing a discrepancy of modeling the structural attribute based on the revised structural model; and displaying, within the graphic window on the physical display, the adjusted difference values, wherein the seismic interpretation is among a sequence of seismic interpretations that are iteratively performed until the adjusted difference values satisfy a pre-determined criterion.

5. The method of claim 3, wherein the structural attribute comprises a layer dip attribute, wherein the structural model further comprises a plurality of faults, the method further comprising:

detecting, during the seismic interpretation, an additional fault from the seismic volume based on at least the difference values of the layer dip attribute, wherein the additional fault was not included in the structural model; and generating the revised structural model by adding the additional fault to the plurality of faults.

6. The method of claim 1, further comprising:

determining, based on a sequence of the plurality of structural layers, a plurality of relative geologic ages of the plurality of structural layers, wherein the structurally-derived values are determined based on the plurality of relative geologic ages.

7. The method of claim 1, wherein the structural attribute comprises at least one selected from a group consisting of a layer dip attribute, a convergence density attribute, a layer curvature attribute, and a layer thickness attribute.

8. The method of claim 1, wherein the seismic volume comprises a plurality of three-dimensional (3D) seismic cells that are associated with the plurality of seismically-derived values of the structural attribute, wherein the structural model comprises a plurality of 3D structural cells that are associated with the plurality of structurally-derived values of the structural attribute, wherein the plurality of difference values are generated by comparing the plurality of seismically-derived values and the plurality of structurally-derived values, wherein comparing the plurality of seismically-derived values and the plurality of structurally-derived values comprises matching the plurality of seismic cells and the plurality of structural cells to generate a plurality of re-sampled cells, wherein the plurality of difference values are associated with the plurality of re-sampled cells, the method further comprising:

displaying, within a graphic window on the physical display, the plurality of difference values with respect to the plurality of re-sampled cells.

9. The method of claim 8, wherein the structural model further comprises a plurality of faults, the method further comprising:

determining a plurality of fault neighborhood zones within a pre-determined distance from the plurality of faults; and qualifying a subset of the plurality of difference values based on at least one selected from a group consisting of (i) a corresponding subset of the plurality of re-sampled cells being outside of the plurality of fault neighborhood zones and (ii) a seismic quality measure of the corresponding subset of the plurality of re-sampled cells, wherein the displaying is in response to the qualifying.

10. A system for modeling a subterranean formation of a field, comprising:

a seismic volume analyzer executing on a computer processor and configured to:

compute, based on a seismic volume comprising a set of seismic traces of a subterranean formation of the field, a plurality of seismically-derived values of a structural attribute representing a structural characteristic of the subterranean formation;

a modeling engine executing on the computer processor and configured to:

compute, based on a structural model, a plurality of structurally-derived values of the structural attribute, the structural model comprising a plurality of structural layers of the subterranean formation;

compare the seismically-derived values and the structurally-derived values to generate a plurality of difference values representing a discrepancy of modeling the structural attribute at a corresponding location in the subterranean formation;

determine a statistical representation of the difference values; and generate a seismic interpretation result based on the difference values and the corresponding location; and a data repository coupled to the computer processor and configured to store the seismic volume, the structural model, the difference values with the corresponding location, and the statistical representation of the difference values, wherein in response to the statistical representation of the difference values exceeding a threshold, it is determined that the seismically-derived values is to be adjusted to reduce the difference values, and in response to the statistical representation of the difference values not exceeding the threshold, it is determined that a field operation is to be performed based on the structural model.

11. The system of claim 10, further comprising:

a graphic display engine configured to display, within a graphic window on a physical display, the difference values and the corresponding location, wherein the seismic volume analyzer is further configured to perform, in response to the displaying, seismic interpretation of the seismic volume to generate a seismic interpretation result, wherein the seismic interpretation is adjusted based at least on the difference values and the corresponding location.

12. The system of claim 11, wherein the modeling engine is further configured to:

receive, in response to generating the seismic interpretation result, an adjustment of the structural model to generate the revised structural model, wherein the adjustment is based on the difference values and the corresponding location, wherein the system further comprises:

a structural model generator configured to analyze the seismic volume to generate the structural model of the subterranean formation; and a field task engine configured to perform a field operation based on the revised structural model.

13. The system of claim 12, wherein the modeling engine is further configured to:

compute, based on the revised structural model, a plurality of adjusted structurally-derived values of the structural attribute;

compare the seismically-derived values and the adjusted structurally-derived values to generate a plurality of adjusted difference values representing a discrepancy of modeling the structural attribute based on the revised structural model; and display, within the graphic window on the physical display, the adjusted difference values, wherein the seismic interpretation is among a sequence of seismic interpretations that are iteratively performed until the adjusted difference values satisfy a pre-determined criterion.

14. The system of claim 12, wherein the structural attribute comprises a layer dip attribute, wherein the structural model further comprises a plurality of faults, wherein the seismic volume analyzer is further configured to:

detect, during the seismic interpretation, an additional fault from the seismic volume based on at least the difference values of the layer dip attribute, wherein the additional fault was not included in the structural model, and wherein the structural model generator is further configured to generate the revised structural model by adding the additional fault to the plurality of faults.

15. A computer program product comprising computer readable program code embodied therein for modeling a subterranean formation of a field, the computer readable program code comprising steps for:

obtaining a seismic volume comprising a plurality of seismic traces of the subterranean formation of the field;

computing, based on the seismic volume, a plurality of seismically-derived values of a structural attribute representing a structural characteristic of the subterranean formation;

performing a seismic interpretation of the seismic volume;

computing, based on a structural model, a plurality of structurally-derived values of the structural attribute, the structural model comprising a plurality of structural layers of the of the subterranean formation;

comparing the seismically-derived values and the structurally-derived values to generate a plurality of difference values representing a discrepancy of modeling the structural attribute at a corresponding location in the subterranean formation;

determining a statistical representation of the difference values;

in response to the statistical representation of the difference values not exceeding a threshold, determining that a field operation is to be performed based on the structural model;

when the statistical representation of the difference values exceeds the threshold, determining if the seismic interpretation needs to be adjusted;

when the statistical representation of the difference values exceeds the threshold, determining if the structural model needs to be adjusted; and when it is determined the seismic interpretation or structural model needs to adjusted, adjusting the seismic interpretation or structural model until the statistical representation of the difference values does not exceed the threshold, and thereafter determining that a field operation is to be performed based on the structural model.

16. The computer program product of claim 15, further comprising:

displaying, within a graphic window on a physical display, the difference values and the corresponding location; and performing, in response to the displaying, seismic interpretation of the seismic volume to generate the seismic interpretation result, wherein the seismic interpretation is adjusted based at least on the difference values and the corresponding location.

17. The computer program product of claim 16, further comprising:

receiving, in response to generating the seismic interpretation result, an adjustment of the structural model to generate the revised structural model, wherein the adjustment is based on the difference values and the corresponding location; and performing a field operation based on the revised structural model.

18. The computer program product of claim 17, further comprising:

computing, based on the revised structural model, a plurality of adjusted structurally-derived values of the structural attribute;

comparing the seismically-derived values and the adjusted structurally-derived values to generate a plurality of adjusted difference values representing a discrepancy of modeling the structural attribute based on the revised structural model; and displaying, within the graphic window on the physical display, the adjusted difference values, wherein the seismic interpretation is among a sequence of seismic interpretations that are iteratively performed until the adjusted difference values satisfy a pre-determined criterion.

19. The computer program product of claim 17, wherein the structural attribute comprises a layer dip attribute, wherein the structural model further comprises a plurality of faults, the method further comprising:

detecting, during the seismic interpretation, an additional fault from the seismic volume based on at least the difference values of the layer dip attribute, wherein the additional fault was not included in the structural model; and generating the revised structural model by adding the additional fault to the plurality of faults.

* * * * *